Dec. 31, 1929.  W. M. THOMAS  1,741,385
PROJECTOR FOR COLORED MOTION PICTURES
Filed Sept. 5, 1923  3 Sheets-Sheet 1
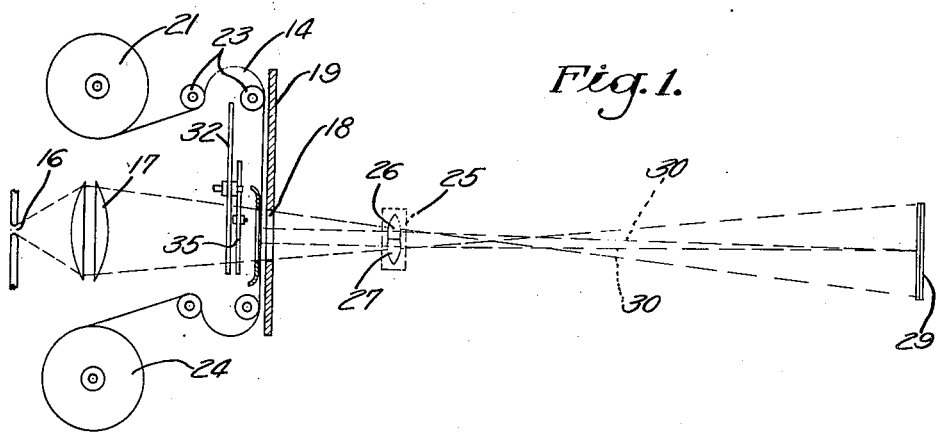
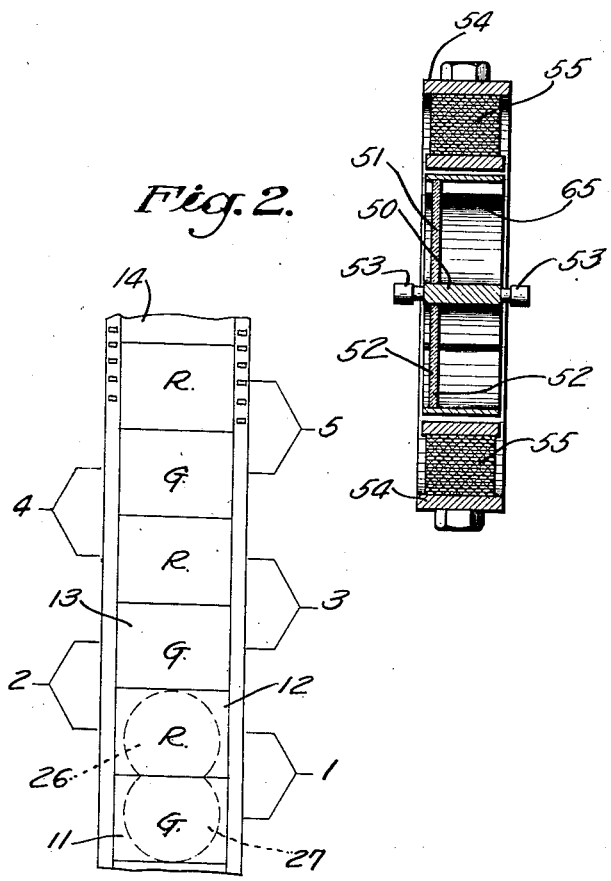
INVENTOR:
William M. Thomas
By
Graham + Davis
ATTORNEYS Dec. 31, 1929.                W. M. THOMAS                    1,741,385
              PROJECTOR FOR COLORED MOTION PICTURES
                    Filed Sept. 5, 1923       3 Sheets-Sheet 2
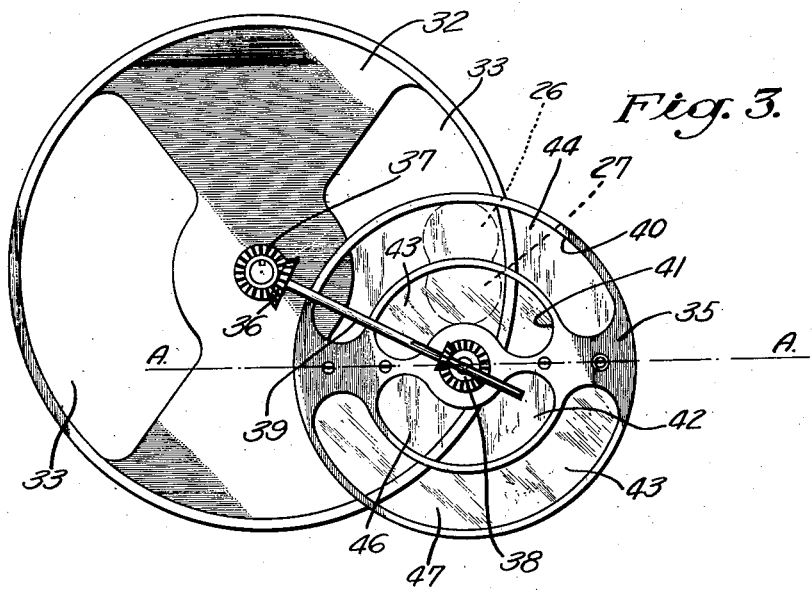
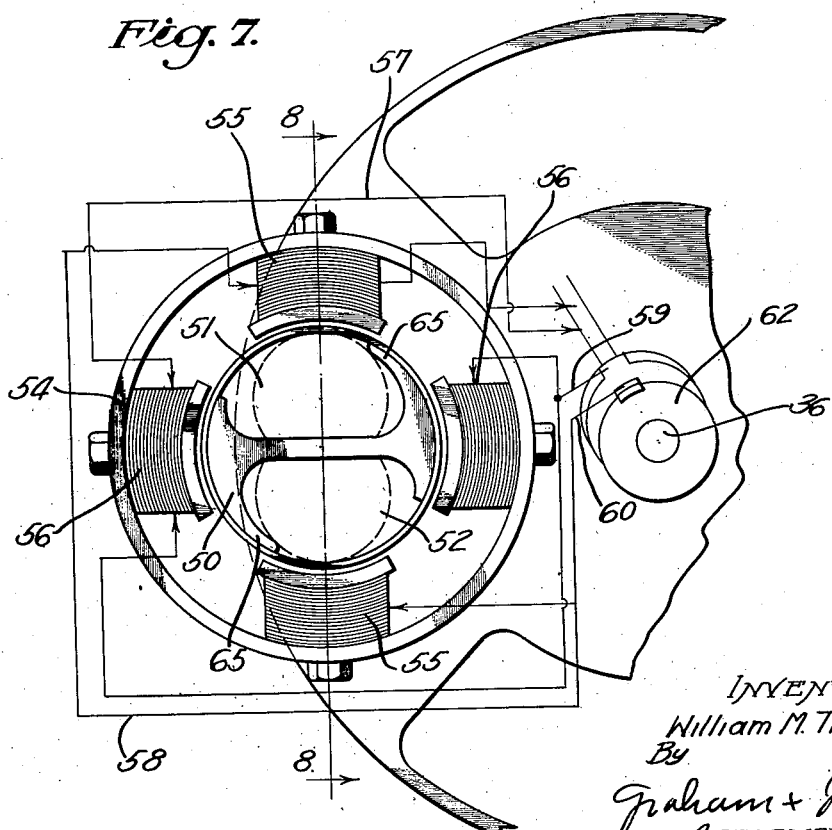
INVENTOR
William M. Thomas
By
Graham + Harris
ATTORNEYS Dec. 31, 1929.  W. M. THOMAS  1,741,385
PROJECTOR FOR COLORED MOTION PICTURES
Filed Sept. 5, 1923   3 Sheets-Sheet 3
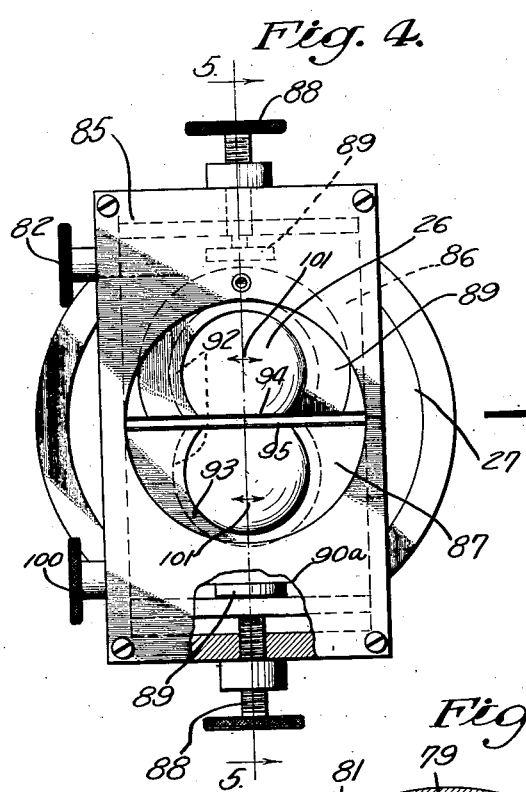
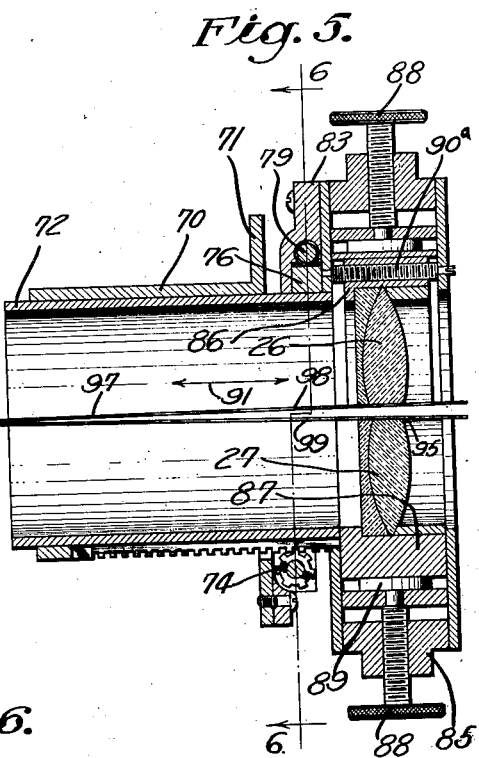
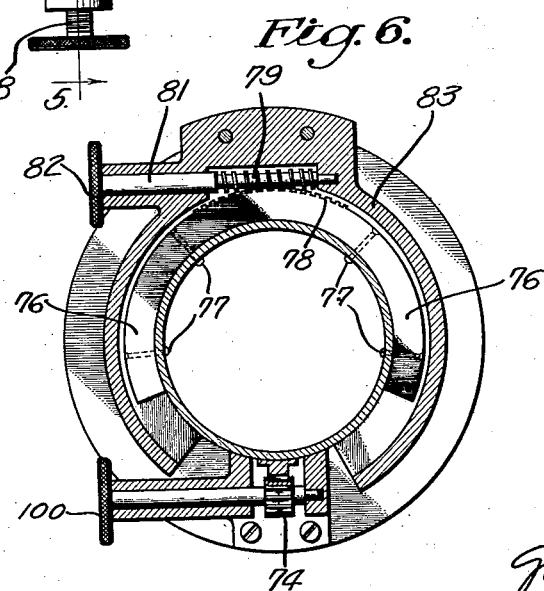
INVENTOR
William M. Thomas
By
Graham + Xavier
ATTORNEYS Patented Dec. 31, 1929

1,741,385

UNITED STATES PATENT OFFICE

WILLIAM M. THOMAS, OF LOS ANGELES, CALIFORNIA, ASSIGNOR, BY MESNE ASSIGNMENTS, TO WILLIAM M. THOMAS AND FOSTER A. LEONARD, BOTH OF LOS ANGELES, CALIFORNIA, A COPARTNERSHIP

PROJECTOR FOR COLORED MOTION PICTURES

Application filed September 5, 1923. Serial No. 660,967.

This invention relates to the art of projecting colored photographic images and relates to a projector which may be employed in the projection of colored motion pictures and is suitable for employment in the practice of the method of producing color projection, for which I am at this time applying for Letters Patent in the United States.

The invention has for its principal object to provide a machine in which a number of color value positives are projected simultaneously in superposed relationship upon a screen, colored light corresponding to the color value of each positive being employed in the projection thereof with the result that natural color effects are produced.

The invention provides a projector having a light aperture through which the images of adjacent frames of the color value film are simultaneously projected and is provided with a compound lens by which the images from these two frames are focused upon a screen in superposed relationship and further provides means for changing the color characteristics of the projection light to correspond with the color value of the frames in projection.

The especial advantages of the invention and further objects thereof will be made evident hereinafter.

Referring to the drawings which are for illustrative purposes only:

Fig. 1 is a diagrammatic elevational view indicating the assocation of parts forming an embodiment of the invention.

Fig. 2 is a section of a color value film employed in the projector.

Fig. 3 is an enlarged elevation showing the manner in which one form of color screen which I have devised may be employed in cooperation with the shutter mechanism of the camera.

Fig. 4 is an end elevation of the projection lens mechanism.

Fig. 5 is a vertical section taken on a plane represented by the line 5—5 of Fig. 4.

Fig. 6 is a section taken on a plane represented by the line 6—6 of Fig. 5.

Fig. 7 is a fragmentary elevation showing another form of color screen mechanism which may be employed in the device.

Fig. 8 is a section taken on a plane represented by the line 8—8 of Fig. 7.

In the process of photographic color reproduction with which the projector is employed, a color value film of the character indicated in Fig. 2 is employed. This film is photographed through a pair of color filters which alternate before the camera in such a manner that one frame will be a record of the color values taken through one of the color filters and the succeeding frame will be a color record of the color values taken through the other color filter.

In the practice of the invention, it is generally convenient to employ red and green as the primary colors from which the color records are obtained and in this practice the alternate frames 11, 12 and 13 of the film 14 constitute color values red and green as indicated.

The projector indicated in Fig. 1 provides a light source 16 and condensing lenses 17 which direct the projection light through an aperture 18 in a wall 19 of the projecting machine. This aperture is of the customary film width but is of a height corresponding to two frames of the film 14 which film as indicated in Fig. 1 is carried from a reel 21 over pulleys 23 and before the aperture 18 from whence it is carried to a reel 24. Disposed before the aperture 18 is a compound lens arrangement 25 having a pair of projecting lenses 26 and 27 vertically disposed in such a manner that the images from two succeeding frames in front of the aperture 18 are projected upon a screen 29 in superposed relationship. In other words, the images fall one upon the other and thus occupy the same area, the centers thereof, as indicated by the dotted projection lines 30, striking the same point upon the screen 29.

In accordance with customary practice, a shutter 32 is employed in the form of a perforated disc having openings 33 therein, as shown in the detail Fig. 3, which may be driven from the shutter shaft 36 by bevel gear sets 37 and 39 and an interconnecting shaft 39. The screen 35 has cooperating pairs of substantially semi-circular openings 40 and 41 therein on one side of the diametral axis A—A of the screen 35 and openings 42 and 43 are situated upon the opposite side. In the opening 40, a red color filter may be placed and in the opening 41 a green color filter may be placed. In the openings 42 and 43, the arrangement of the color filter is reversed, the red being in the inner opening 42 whereas the green is placed in the outer opening 43. The gears 37 and 38 are so proportioned that the screen 35 is revolved through a half revolution during each advance of a single frame of the film 14 in the projecting machine. Therefore, with each advance in the position of the film, the disposal of colored filters in alignment with the aperture and the projection lenses indicated at 25 will be reversed. When the screen 35 is in the position shown in Fig. 3, the upper portion of the shaft of light from the condensing lenses 17 will be filtered through the red filter 44 and the lower half thereof will be filtered by the green filter 45. During this position of the color screen, the frames 11 and 12 of the film 14, Fig. 2, are disposed before the aperture 18, thus bringing a green color value frame in alignment with the lower lens 27 and a red color value frame in alignment with the upper lens 26 of the compound lens arrangement 25. With the next advance of the film, the entire film is moved downwardly a distance corresponding to one frame thereof, thus bringing the pair of frames indicated at 2, Fig. 2, before the aperture 18, the lowermost frame now before the aperture being the previous upper remaining frame 12, whereas the upper position of the space before the aperture 18 is now occupied by the green color value frame 13.

It will be evident that the disposal of color values before the aperture is now reversed. The color screen 35 during the movement of the film has been rotated through a half revolution bringing the red filter 46 into alignment with the lens 27 and the green filter 47 into alignment with the lens 26, thus reversing the order of color filters disposed in the path of light which must be employed in projecting the images from the frames 12 and 13. It will be recognized that with each advance of the film 14, the disposal of color values before the aperture 18 is reversed and that due to the rotation of the color screen 35, the filtration of the light is reversed to correspond with the reversing of the color value. Each frame of the film receives two exposures before the aperture 18 and is, therefore projected twice upon the screen 29 and with each passage of light through the shutter 32, a pair of color value images in their respective color proportions are superposed upon the screen.

Another form of color screen which may be employed in the operation of the device is shown in Fig. 7 and consists of an armature 50 having red and green color filters 51 and 52 supported therein upon each side of a diametral axis and being rotatable upon a shaft 53. Disposed in a suitable field 54 are opposing pairs of magnets 55 and 56 which are connected through systems of conductors 57 and 58 with brushes 59 and 60 which ride on the surface of a commutator switch 62. With each advance of the film, the switch 62 being mounted upon the shutter shaft 36 is rotated through a half revolution and one pair of the magnets 55 or 56 energized thus causing the armature 50 to be rotated into alignment with the energized pair of magnets. Extending toe formations 65 are formed upon the ends of the armature in order to provide a path for the magnetic flux in a definite direction with the result that the armature is partially rotated in one direction with each advance of the film.

In Figs. 4, 5 and 6 is shown the mounting means for the projecting lenses 26 and 27. A stationary tubular sleeve 70 is provided, this sleeve having a flange 71 by which it may be secured to the structure of the projecting machine. Within the sleeve 70, a sleeve 72 is slidably disposed and is provided with a rack 73 engaged by a small spur gear 74 for the purpose of moving the sleeve 72 axially within the sleeve 70. Upon the forward end of the sleeve 72, an arc 76 is secured by use of rivets 77 or other suitable means. This arc 76 is part of a continuous ring and has worm threads 78 formed on the upper portion thereof which are engaged by a screw 79 formed on a shaft 81 equipped with a thumb wheel 82, in order that by rotation of the thumb wheel 82, the circular housing 83 which encloses the arc 76 may be caused to rotate through a small angular distance. Secured to the housing member 83 is a lens box 85 which is of rectangular form and has fitted therein a pair of blocks 86 and 87 which are vertically slidable within the box and are moved in their direction of travel by screws 88 having discs 89, Figs. 4 and 5, formed on the inner ends thereof for engagement with T slots 90 formed in the blocks 86 and 87. Into the block 86 a cylindrical secondary block 80 is fitted, this secondary block having a screw 90ª extending therethrough for the purpose of providing a movement of the secondary block 80 in the direction indicated by the arrow 91, Fig. 5. The block 87 and the secondary block 80 are bored near the adjacent edges thereof as indicated by the numeral 92, Fig. 4, to receive the lens arrangements 26 and 27 which are held in place by rings 93. It will be noticed that the bores 92 are not confined within the blocks but open through the adjacent edges thereof. The lenses are ground off flat at their inner edges 94 and 95 which permits the centers thereof to be brought closer together than would be possible with a fully circular lens. A dividing wall 97 is provided between the adjacently disposed edges 94 and 95 of the lenses in the form of a V shaped flat spring element, the leaves 98 and 99 of which bear outwardly against the lenses. The V-shaped flat spring functions to separate the light passed through each frame in projection and also allows the focusing lenses to move through a very short arc. This arcuate movement of the lenses is necessary to maintain the lenses in axial alignment with the centers of the frames being projected when the lenses are adjusted to suit such varying conditions as screen size and screen distance. By keeping the lenses in axial alignment with the centers of the frames being projected, wedge-shaped or distorted pictures produced by various other projecting devices for superimposing pictures are eliminated. By the arrangement shown four adjustments of the lenses are provided, making it possible to accurately focus and superpose the images of the pair of frames of a film upon a screen. It will be recognized that by rotating the thumb wheel 100, the gear 74 will cause the movement of the sleeve 72 and the lenses 26 and 27 in the direction of the projection light, thus making it possible when the other adjustments have previously been properly made to quickly focus the images upon the screen. By rotation of the screw 90ª, the secondary block 80 may be moved in the direction taken by the projection light, thus making it possible to set the lens 26 a little forward or rearward of the lens 27, enabling thereby the bringing of the lenses 26 and 27 into proper focus. A lateral relative movement of the lenses in the direction indicated by the arrows 101 is accomplished by rotating the lens box upon the sleeve 72 which may be done by turning the thumb wheel 82 associated with the screw 79 in engagement with the arc 76. Vertical relative adjustment of the lenses is accomplished by the screws 88 which make it possible to move either block 86 or 87 independently in vertical direction within the lens box 85. The extreme accuracy of adjustment enabled by this structure results in perfect placement of the colors in the projected image composed of the superposed color value images from the pair of frames of the color value film.

The structure which I have shown is adapted to be attached to the projecting machines now in use and thus enables colored motion pictures to be shown, using present equipment in connection with my device. This advantage obviously has a huge economic importance. The amount of money invested in projection machines is so great that the owners of such machines prefer to forego the showing of colored pictures than to procure new machines which have been made to be connected to various patented color reproducing devices. It is, therefore, apparent that my device, by adaptation to the projection machines now in use, promotes one of the useful arts.

I claim as my invention:

1. In a projector, the combination of: means producing a shaft of projecting lights; mechanism for advancing a motion picture film across said shaft of light; two projection lenses one for each of two adjacent frames of said film, said lenses being disposed close together so that the images of said frames are transmitted by said light through said lenses and are projected in superimposed relation upon a receptive surface; means for resiliently urging said lenses outwardly; and means for sliding one of said lenses longitudinally upon said septum.

2. In a projector, the combination of: means producing a shaft of projecting light; mechanism for advancing a motion picture film across said shaft of light; two projection lenses one for each of two adjacent frames of said film, said lenses being disposed close together so that the images of said frames are transmitted by said light through said lenses and are projected in superimposed relation upon a receptive surface; means for resiliently urging said lenses outwardly, said means comprising a spring septum disposed between said film and said lenses to confine each of said images to one of said lenses; means for separately moving said lenses inwardly against said resilient means; and means for sliding one of said lenses longitudinally upon said septum.

In testimony whereof, I have hereunto set my hand at Los Angeles, California, this 30th day of August, 1923.

WILLIAM M. THOMAS.